(12) United States Patent
Sawanobori

(10) Patent No.: US 12,088,901 B2
(45) Date of Patent: Sep. 10, 2024

(54) BLADE OPEN-CLOSE DEVICE AND ELECTRONIC DEVICE

(71) Applicant: NIDEC COPAL CORPORATION, Tokyo (JP)

(72) Inventor: Koji Sawanobori, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 14 days.

(21) Appl. No.: 17/875,414

(22) Filed: Jul. 28, 2022

(65) Prior Publication Data

US 2024/0040221 A1 Feb. 1, 2024

(51) Int. Cl.
G06F 21/82 (2013.01)
G03B 11/04 (2021.01)
H04N 23/55 (2023.01)

(52) U.S. Cl.
CPC ........... H04N 23/55 (2023.01); G03B 11/043 (2013.01)

(58) Field of Classification Search
USPC ........................................ 396/161, 452, 471
See application file for complete search history.

(56) References Cited

U.S. PATENT DOCUMENTS

| | | | |
|---|---|---|---|
| 8,174,609 B2 | 5/2012 | Sekimoto et al. | |
| 11,611,687 B2 * | 3/2023 | Ushio | H04N 23/51 |
| 11,758,254 B2 * | 9/2023 | Ushio | H04N 23/56 |
| | | | 348/374 |
| 2019/0246014 A1 | 8/2019 | Huang et al. | |
| 2019/0339508 A1 * | 11/2019 | Jeong | H04N 23/55 |
| 2020/0249415 A1 | 8/2020 | Wang et al. | |
| 2020/0374432 A1 | 11/2020 | Cho et al. | |
| 2021/0033948 A1 * | 2/2021 | Ushio | G03B 11/043 |
| 2023/0026738 A1 * | 1/2023 | Ushio | G03B 11/043 |

FOREIGN PATENT DOCUMENTS

| | | |
|---|---|---|
| JP | 2013167817 A | 8/2013 |
| JP | 2016020976 A | 2/2016 |

OTHER PUBLICATIONS

Office Action in JP Application No. 2021-033235, mailed Jul. 23, 2024. 8pp.

\* cited by examiner

*Primary Examiner* — Clayton E. LaBalle
*Assistant Examiner* — Warren K Fenwick
(74) *Attorney, Agent, or Firm* — HAUPTMAN HAM, LLP

(57) ABSTRACT

A thin blade open-close device includes a base member including spaces accommodating lens units, a cover plate covering the base member partially, and a blade member between the base member and the cover plate. The cover plate has openings aligned with optical axes of the lens units. The blade member includes a first light shield that covers the opening in the cover plate, a light entry opening that connects with the opening in the cover plate, and a second light shield that covers the opening in the cover plate. The blade open-close device includes a drive actuator that moves the blade member in a closing direction to change from an open state to a closed state in which the first light shield and the second light shield in the blade member cover the openings in the cover plate.

8 Claims, 14 Drawing Sheets

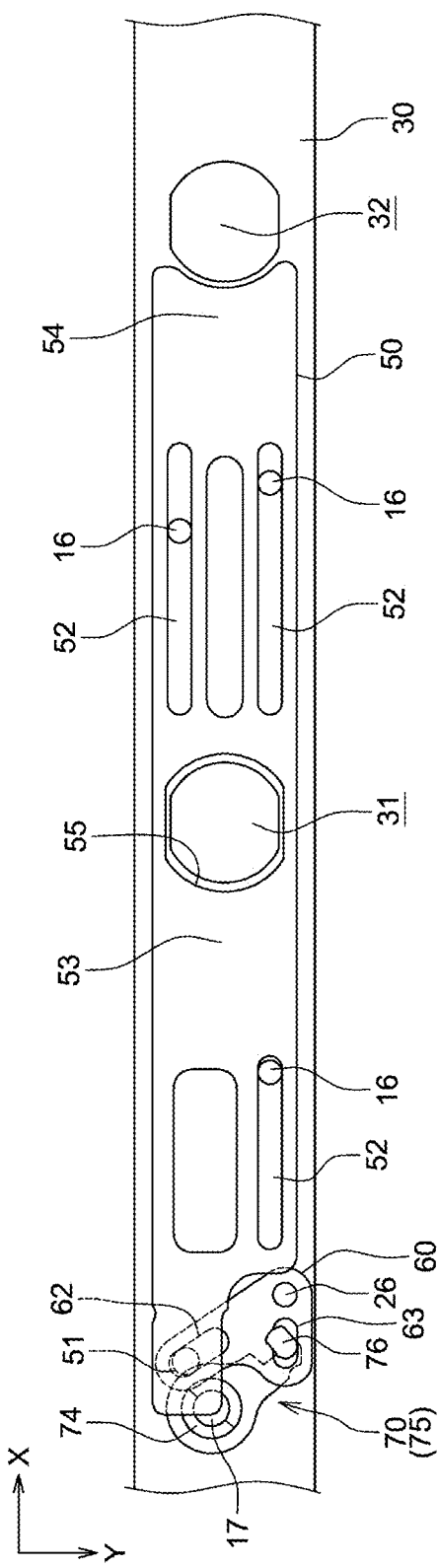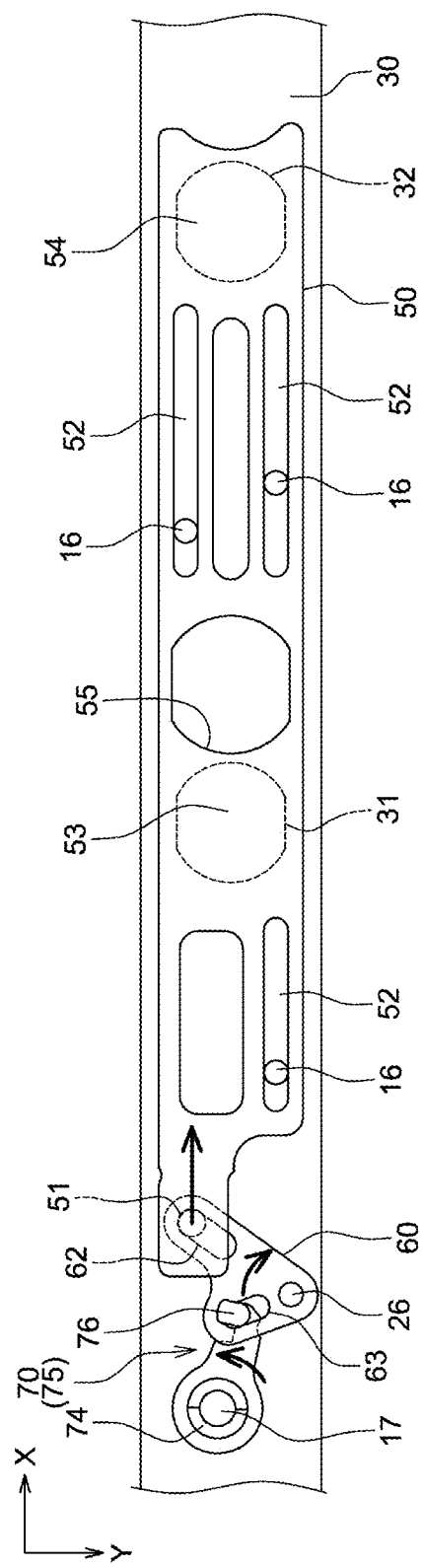

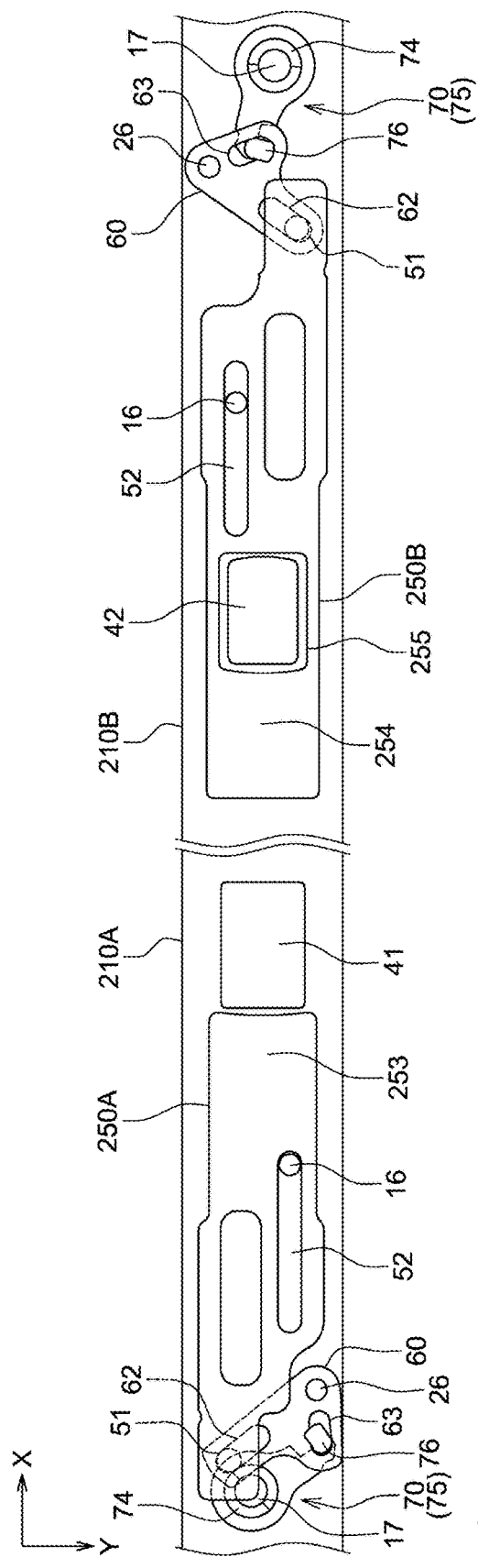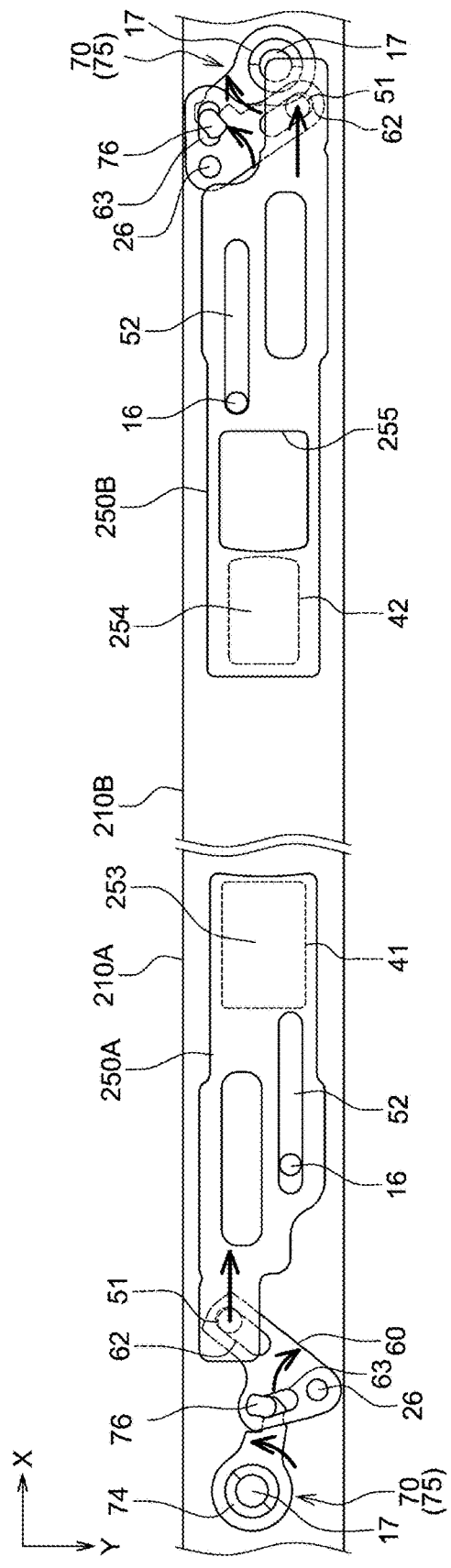

BLADE OPEN-CLOSE DEVICE AND ELECTRONIC DEVICE

BACKGROUND

Technical Field

The present invention relates to a blade open-close device and an electronic device, and particularly, to a blade open-close device for covering and uncovering an opening with a blade member.

Description of the Background

Recent electronic devices, such as smartphones, smart speakers, and drones, incorporate cameras. Such a camera typically has a lens aperture constantly uncovered, or being constantly ready for image capturing. In this state, the camera may be operated by a malicious third party, possibly capturing images or videos unintended by the user. Such images or videos can be used for crime.

In particular, electronic devices incorporating cameras are now often connected to a network such as the Internet. The connected electronic devices may be operated remotely by a malicious program without being noticed by the user. When the electronic device is operated remotely, image capturing may be performed without being noticed by the user, possibly allowing the camera to capture images or videos for transmission to external devices. For privacy protection of the user, structures are awaited for shielding against image capturing with a camera when unintended by the user.

Such structures for preventing image capturing with a camera may include a known camera shutter that opens and closes a blade between a lens and a subject (refer to, for example, Patent Literature 1). However, the camera shutter may not fit in an electronic device that is smaller and has a limited space for a camera module. In particular, many recent electronic devices may each include multiple cameras and thus have more space limitations.

CITATION LIST

Patent Literature

Patent Literature 1: Japanese Unexamined Patent Application Publication No. 2009-288327

BRIEF SUMMARY

In response to the above issue, one or more aspects of the present invention are directed to a thin blade open-close device incorporated in a limited space and an electronic device including the blade open-close device.

A thin blade open-close device according to an aspect of the present invention can be incorporated in a limited space. The blade open-close device includes a base including a first space accommodating a first lens unit and a second space accommodating a second lens unit, a cover covering the base at least partially, and a blade between the base and the cover. The cover has a first opening aligned with an optical axis of the first lens unit and a second opening aligned with an optical axis of the second lens unit. The blade includes a first light shield that covers the first opening in the cover, a light entry opening that connects with the first opening in the cover, and a second light shield that covers the second opening in the cover. The blade open-close device includes a drive that moves the blade in a closing direction to change from an open state in which the light entry opening in the blade connects with the first opening in the cover to a closed state in which the first light shield in the blade covers the first opening in the cover and the second light shield in the blade covers the second opening in the cover.

BRIEF DESCRIPTION OF DRAWINGS

FIG. 8A is a schematic plan view of a blade member moved to a position by the drive actuator shown in FIGS. 7A and 7B.

FIG. 8B is a schematic plan view of the blade member moved to a position by the drive actuator shown in FIGS. 7A and 7B.

FIG. 12A is a schematic plan view of the blade member moved to a position by the drive actuator in the blade open-close device shown in FIG. 11.

FIG. 12B is a schematic plan view of the blade member moved to a position by the drive actuator in the blade open-close device shown in FIG. 11.

DETAILED DESCRIPTION

Figure 1:
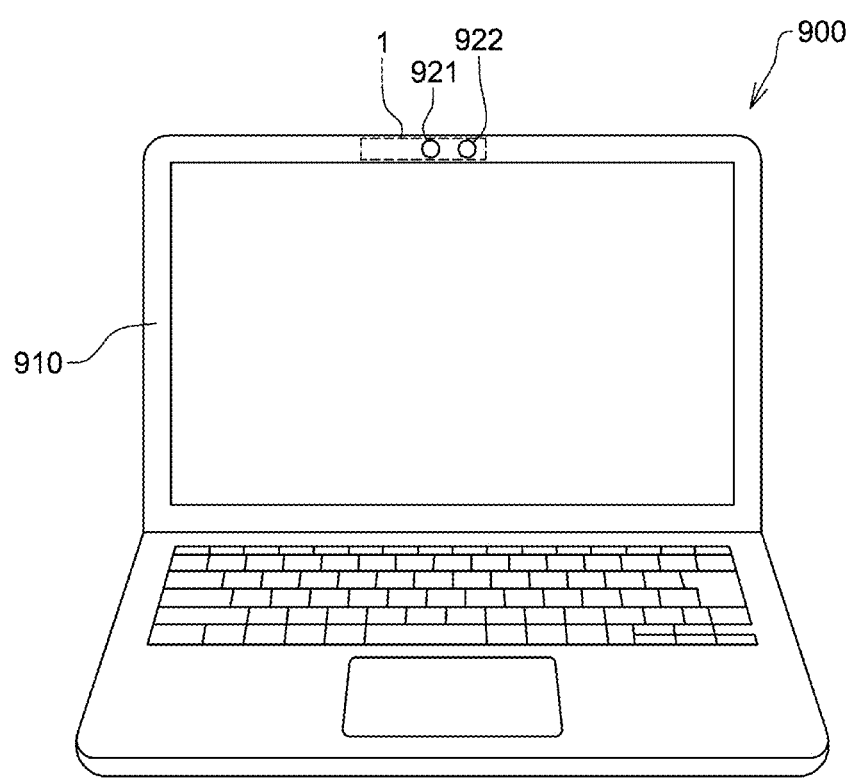
FIG. 1 is a schematic diagram of a laptop personal computer as an electronic device incorporating a blade open-close device according to an embodiment of the present invention.

An electronic device and a blade open-close device according to one or more embodiments of the present invention will now be described in detail with reference to FIGS. 1 to 13. In FIGS. 1 to 13, the same or corresponding components are given the same reference numerals, and will not be described repeatedly. In FIGS. 1 to 13, the scale and dimensions of each component may be exaggerated, or one or more components may not be shown. Unless otherwise specified, the terms such as first and second will be used simply to distinguish the components and will not represent a specific order or sequence.

FIG. 1 is a schematic diagram of a laptop personal computer 900 as an electronic device incorporating a blade open-close device 1 according to an embodiment of the present invention. As shown in FIG. 1, the laptop personal computer 900 includes a display 910 including two windows 921 and 922 for cameras. The laptop personal computer 900 includes camera units (not shown) at positions corresponding to the windows 921 and 922. The blade open-close device 1 is attached to the camera units and incorporated in the laptop personal computer 900. This laptop personal computer 900 has the camera function. Although the electronic device incorporating the blade open-close device 1 is the laptop personal computer 900 in the above example, the blade open-close device according to one or more embodiments of the present invention may be used in many electronic devices having the camera function, such as smart speakers and home security cameras, in addition to laptop personal computers.

Figure 2:
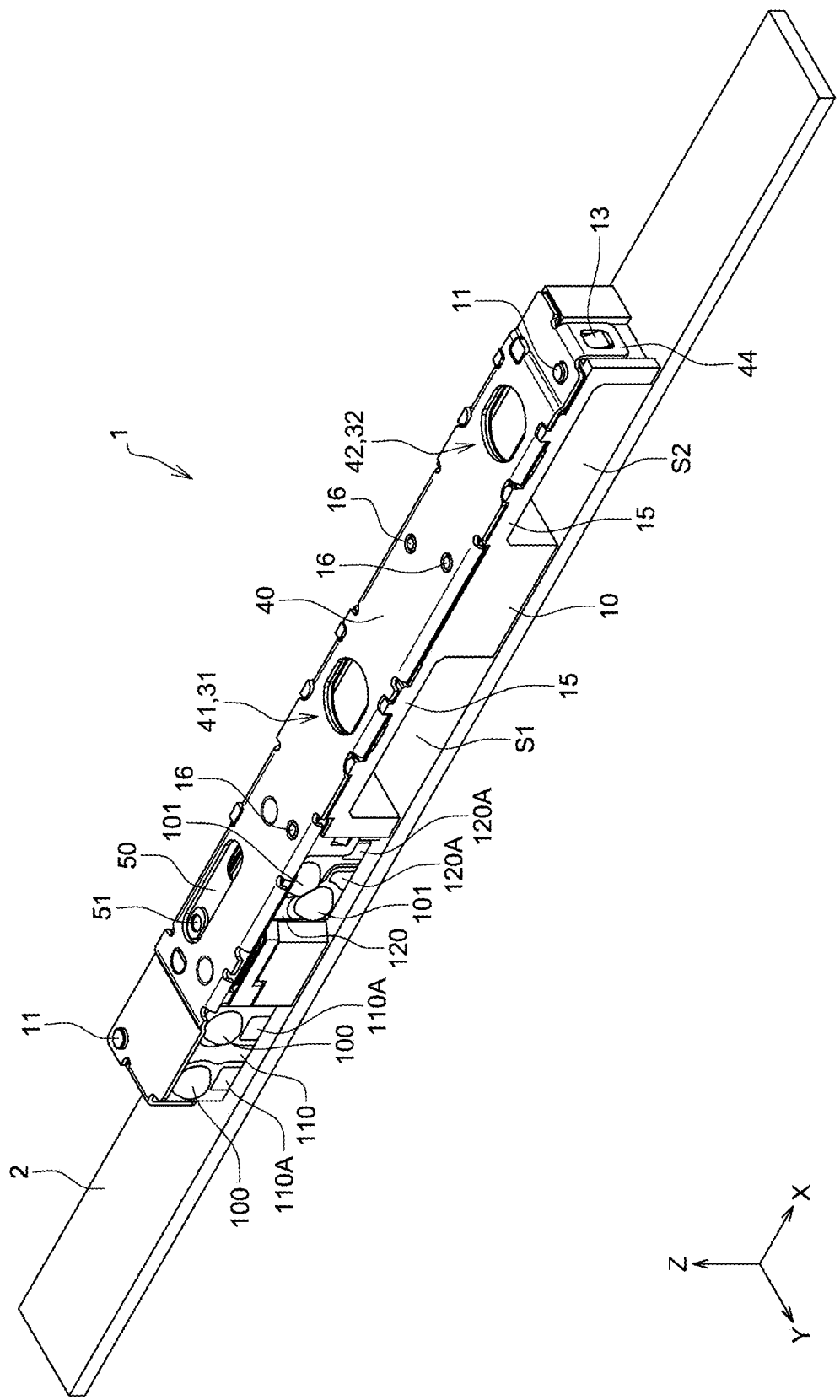
FIG. 2 is a perspective view of the blade open-close device according to the embodiment of the present invention, together with a module board.
Figure 3:
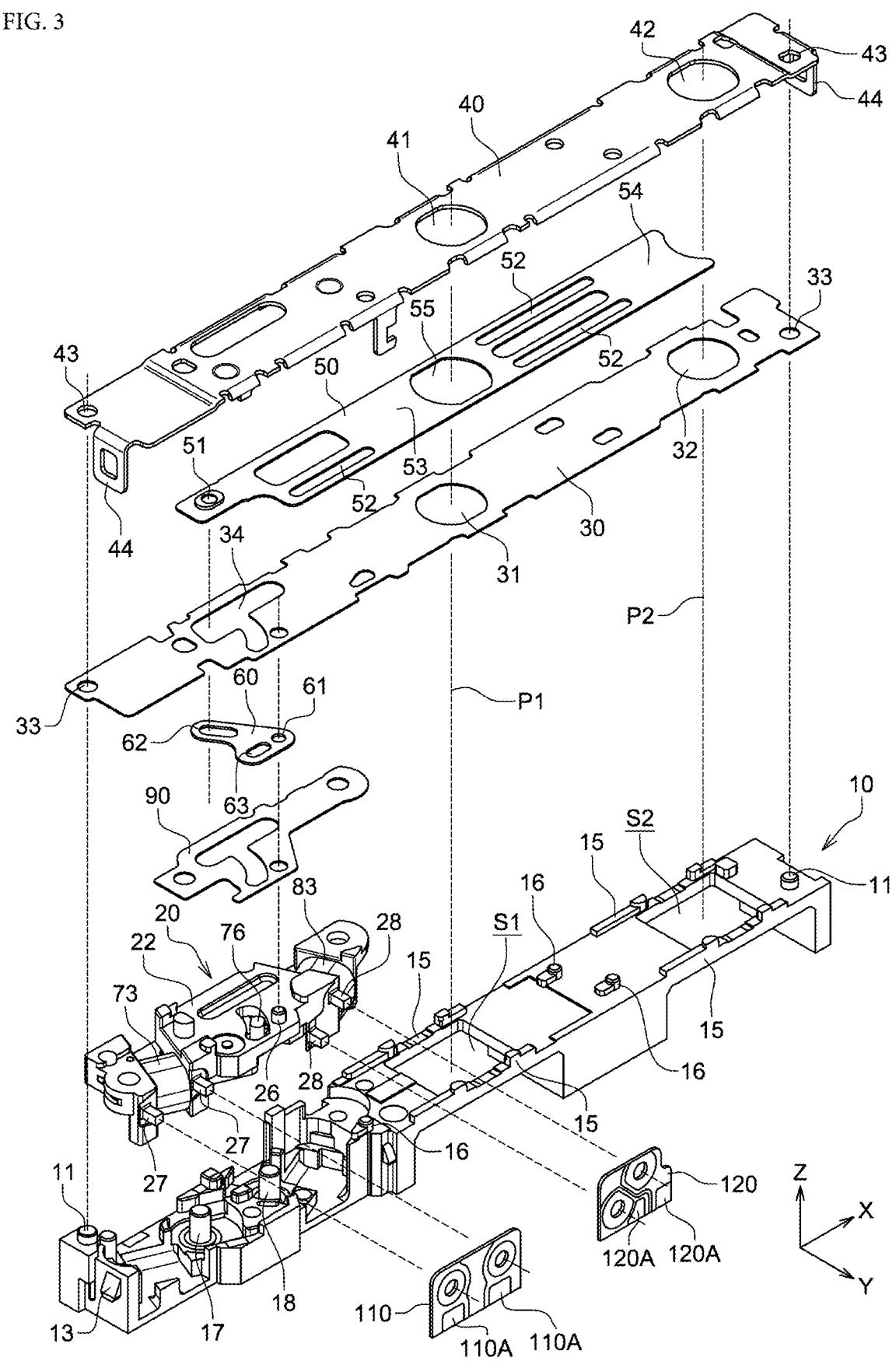
FIG. 3 is an exploded perspective view of the blade open-close device in FIG. 2.
Figure 4:
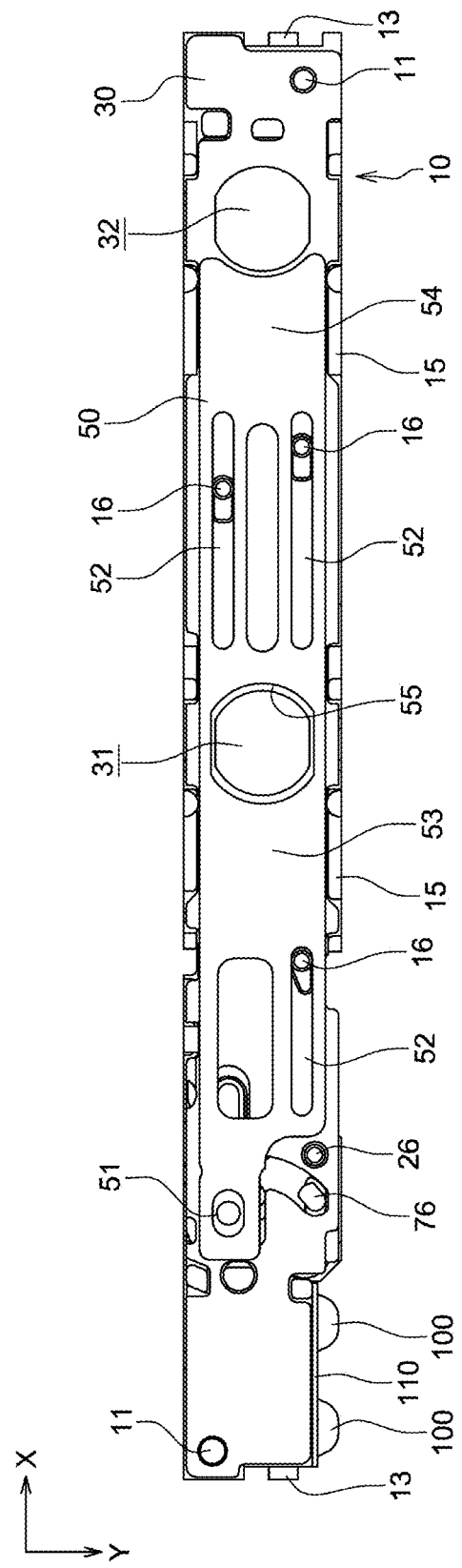
FIG. 4 is a plan view of the blade open-close device in FIG. 2 with a cover plate being removed.

The operation of the blade open-close device 1 will now be described. FIG. 2 is a perspective view of the blade open-close device 1 according to the embodiment of the present invention. FIG. 3 is an exploded perspective view of the device. FIG. 4 is a plan view of the device with a cover plate being removed. The blade open-close device 1 according to the present embodiment is mounted, for example, on camera modules incorporated in the laptop personal computer 900, and more specifically, on a module board 2 on which lens units (not shown) are mounted. For ease of explanation in the present embodiment, up or upward refers to the positive Z-direction, and down or downward refers to the negative Z-direction in FIG. 2.

As shown in FIGS. 2 to 4, the blade open-close device 1 includes a base member 10 (base) attached to the module board 2, an actuator unit 20 located on the base member 10, a partition 30 located on the base member 10, a cover plate 40 (cover) covering an upper portion of the base member 10, a blade member 50 (blade) located between the cover plate 40 and the partition 30, and a cam plate 60 connected to the blade member 50. The base member 10 has two substantially rectangular spaces S1 and S2 each accommodating the lens unit (not shown) mounted on the module board 2.

The partition 30 and the cover plate 40 respectively have openings 31 and 41. The openings 31 and 41 are aligned with an optical axis P1 of one of the lens units. The partition 30 and the cover plate 40 also respectively have openings 32 and 42. The openings 32 and 42 are aligned with an optical axis P2 of the other lens unit. In the illustrated example, the laptop personal computer 900 shown in FIG. 1 has the window 921 aligned with the optical axis P1 and the window 922 aligned with the optical axis P2. The openings 31 and 32 in the partition allow passage of the light that then enters the lens units. The openings 31 and 32 in the partition 30 function as openings (apertures) that determine the amount of light entering the lens units. Thus, the partition 30 may be referred to as an aperture blade. The partition 30 may be eliminated. In this case, the openings 41 and 42 in the cover plate 40 function as the apertures.

The cover plate 40 has multiple pin holes 43. With pins 11 on the base member 10 received in the pin holes 43, the cover plate 40 is attached to the base member 10. The cover plate 40 includes hooks 44. With the hooks 44 engaged with engagement tabs 13 on the base member 10, the cover plate 40 is fastened to the base member 10. Rather than with the illustrated components, the cover plate 40 may be fastened to the base member 10 with, for example, screws.

The partition 30 is located in the positive Z-direction (upward) from the base member 10. The partition 30 has pin holes 33 to receive the pins 11 on the base member 10. The cam plate 60 is located in the negative Z-direction (downward) from the partition 30. A partition is located in the negative Z-direction (downward) from the cam plate 60 and attached to the actuator unit 20.

The blade member 50 is located in the positive Z-direction (upward) from the partition 30. The base member 10 includes guides 15 extending in the positive Z-direction from its two edges in Y-direction. The blade member 50 is located between the guides 15. The blade member 50 has multiple guide slots 52 extending in X-direction. The base member 10 includes multiple guide posts 16 extending in the positive Z-direction. Each guide post 16 on the base member 10 is located in the corresponding guide slot 52 in the blade member 50. The blade member 50 is thus movable, in a blade chamber between the partition 30 and the cover plate 40, in X-direction, while being guided by the guides 15 and the guide posts 16 on the base member 10.

As shown in FIG. 4, the blade member 50 includes a first light shield 53 that can cover the opening 41 in the cover plate 40 and cover the opening 31 in the partition 30, a second light shield 54 that can cover the opening 42 in the cover plate 40 and cover the opening 32 in the partition 30, and a light entry opening 55 that can connect with the opening 41 in the cover plate 40 and connect with the opening 31 in the partition 30. In the state shown in FIG. 4, the light entry opening 55 in the blade member 50 is aligned with the opening 31 in the partition and thus connects with the opening 31 in the partition 30 (and the opening 41 in the cover plate 40). The first light shield 53 and the second light shield 54 are shifted from the openings 31 and 32 in the partition 30.

Figure 5:
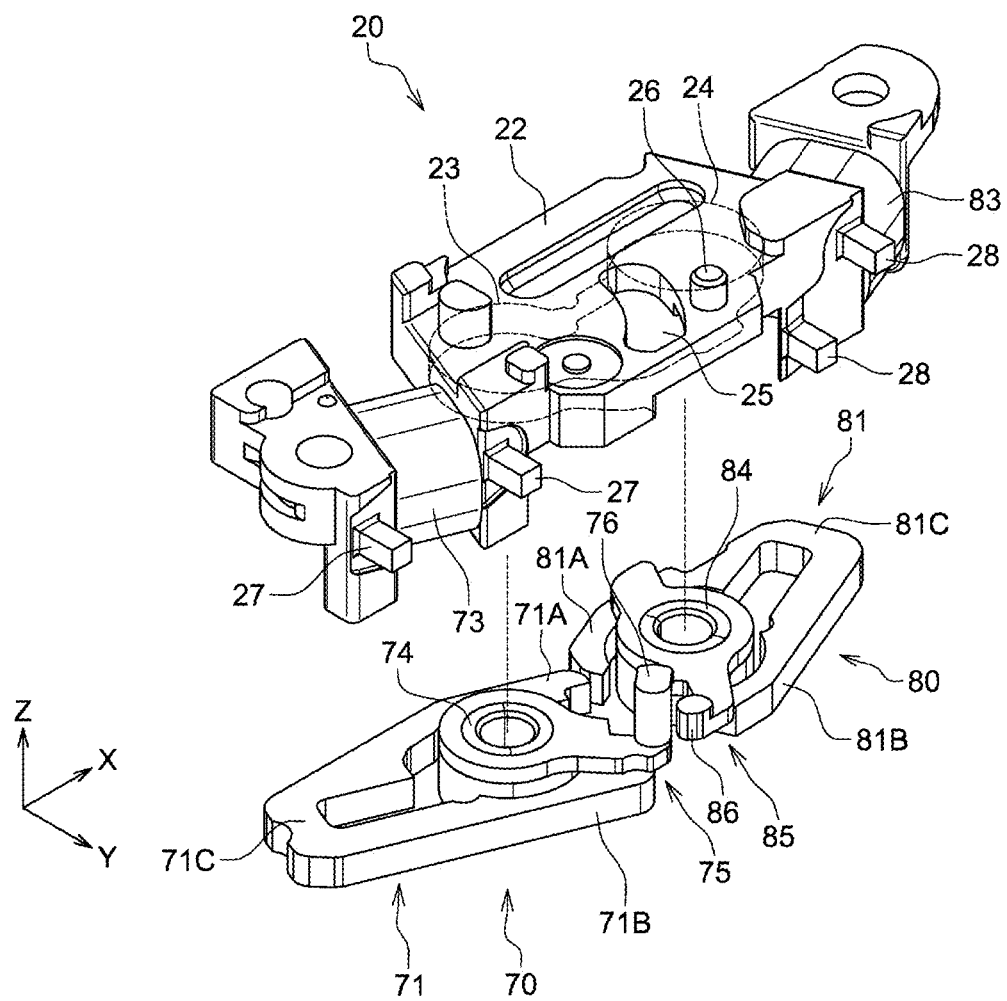
FIG. 5 is an exploded perspective view of an actuator unit included in the blade open-close device in FIG. 2.

FIG. 5 is an exploded perspective view of the actuator unit 20. As shown in FIG. 5, the actuator unit 20 includes a drive actuator 70 (drive) for moving the blade member 50, a stopper actuator 80 for restricting the operation of the drive actuator 70, and an attachment base 22 receiving the drive actuator 70 and the stopper actuator 80.

The drive actuator 70 includes a yoke 71 formed from a magnetic material, a coil 73 wound around the yoke 71 and the attachment base 22, a rotor magnet 74 rotatably attached to a shaft 17 (refer to FIG. 3) extending in the positive Z-direction from the base member 10, and a drive lever 75 connected to the rotor magnet 74. The yoke 71 in the present embodiment is thin and flat in Z-direction. The yoke 71 is U-shaped and includes two arms 71A and 71B. The coil 73 is wound around the arm 71B. The rotor magnet 74 is located between the arms 71A and 71B of the yoke 71. The rotor magnet 74 includes a magnet having different magnetic poles in the circumferential direction. The drive lever 75 includes a connecting part 76 extending in the positive Z-direction radially outside the rotor magnet 74.

The stopper actuator 80 includes a yoke 81 formed from a magnetic material, a coil 83 wound around the yoke 81 and the attachment base 22, a rotor magnet 84 rotatably attached to a shaft 18 (refer to FIG. 3) extending in the positive Z-direction from the base member 10, and a stopper lever 85 connected to the rotor magnet 84. The yoke 81 in the present embodiment is thin and flat in Z-direction. The yoke 81 is U-shaped and includes two arms 81A and 81B. The coil 83 is wound around the arm 81B. The rotor magnet 84 is located between the arms 81A and 81B of the yoke 81. The rotor magnet 84 includes a magnet having different magnetic poles in the circumferential direction. The stopper lever 85 includes a movement restrictor 86 extending in the positive Z-direction radially outside the rotor magnet 84.

As shown in FIG. 5, the attachment base 22 includes a first space 23 accommodating the rotor magnet 74 and the drive lever 75 in the drive actuator 70, and a second space 24 accommodating the rotor magnet 84 and the stopper lever 85 in the stopper actuator 80. The attachment base 22 includes an arc-shaped window 25 to receive the connecting part 76 of the drive lever 75 in the drive actuator 70.

The attachment base 22 includes a support shaft 26 extending in the positive Z-direction. The support shaft 26 is received in a shaft hole 61 in the cam plate 60. With the support shaft 26 on the attachment base 22 received in the shaft hole 61 in the cam plate 60, the cam plate 60 is rotatable about the support shaft 26.

As shown in FIGS. 3 and 5, the attachment base 22 includes terminals 27 and 28 protruding in the positive Y-direction. The blade open-close device 1 includes a terminal plate 110 corresponding to the terminals 27 and a terminal plate 120 corresponding to the terminals 28. The terminal plates 110 and 120 are metal plates extending parallel to an XZ plane.

The coil 73 in the drive actuator 70 has its ends wound around the terminals 27 on the attachment base 22. The ends of the coil 73 are fixed to the terminals 27 with, for example, solder joints 100 together with the terminal plate 110 as shown in FIG. 2. The terminal plate 110 includes connectors 110A at its end adjacent to the module board 2 (in the negative Z-direction). The connectors 110A are electrically connected to contacts on the module board 2 with solder joints (not shown). In this manner, the coil 73 in the drive actuator 70 is electrically connected to wiring (not shown) in the module board 2 with the terminal plate 110.

The coil 83 in the stopper actuator 80 has its ends wound around the terminals 28 on the attachment base 22. The ends of the coil 83 are fixed to the terminals 28 with, for example, solder joints 101 together with the terminal plate 120 as shown in FIG. 2. The terminal plate 120 includes connectors 120A at its end adjacent to the module board 2 (in the negative Z-direction). The connectors 120A are electrically connected to contacts on the module board 2 with solder joints (not shown). In this manner, the coil 83 in the stopper actuator 80 is electrically connected to wiring (not shown) in the module board 2 with the terminal plate 120.

In the present embodiment, the coil 73 in the drive actuator 70 and the coil 83 in the stopper actuator 80 are both wound around and held on the attachment base 22. The single attachment base 22 holds both the coil 73 in the drive actuator 70 and the coil 83 in the stopper actuator 80 to use fewer components and reduce the entire size of the blade open-close device 1.

Figure 6:
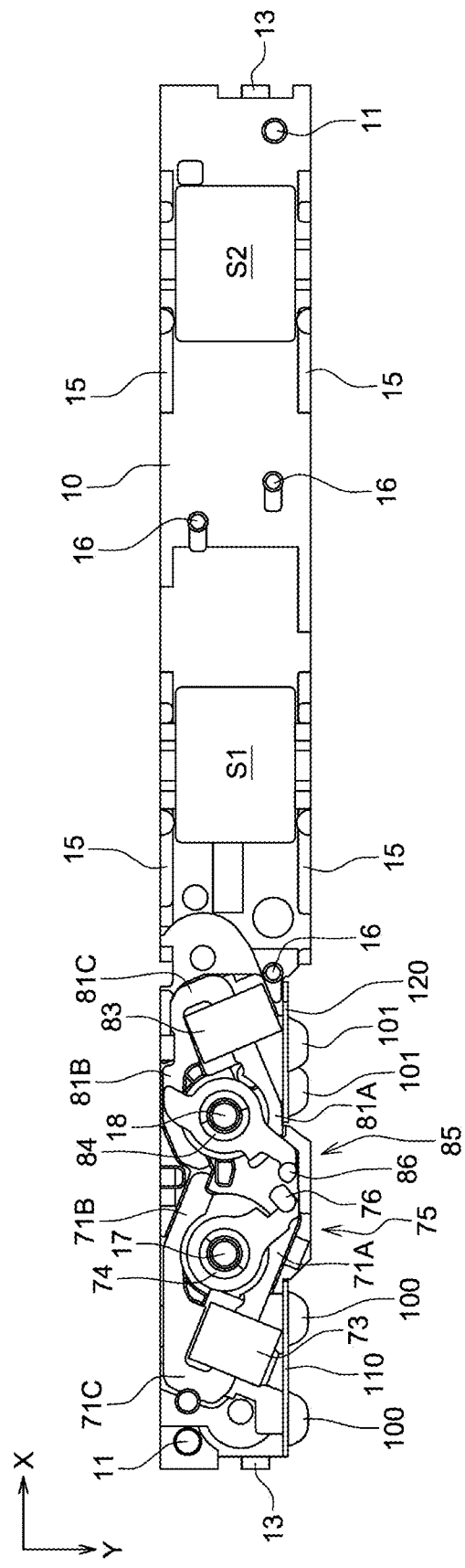
FIG. 6 is a plan view of a drive actuator and a stopper actuator attached to a base member in the blade open-close device in FIG. 2.

FIG. 6 is a plan view of the drive actuator 70 and the stopper actuator 80 attached to the base member 10. As shown in FIG. 6, the drive actuator 70 and the stopper actuator 80 face each other in X-direction. The yoke 71 in the drive actuator 70 has two arms, or the arms 71A and 71B, branching and extending from a base portion 71C. The arm 71A extends from the base portion 71C generally in the positive X-direction. The arm 71B extends from the base portion 71C generally obliquely in the positive Y-direction to X-direction. The coil 73 is wound around the arm 71B. Similarly, the yoke 81 in the stopper actuator 80 has two arms, or the arms 81A and 81B, branching and extending from a base portion 81C. The arm 81A extends from the base portion 81C generally in the negative X-direction. The arm 81B extends from the base portion 81C generally obliquely in the positive Y-direction to X-direction. The coil 83 is wound around the arm 81B. The arm 71A of the yoke 71 in the drive actuator 70 is adjacent to the arm 81A of the yoke 81 in the stopper actuator 80 in X-direction.

This structure allows the drive actuator 70 and the stopper actuator 80 to fit efficiently in any limited space in Y-direction in the blade open-close device 1. The drive actuator 70 and the stopper actuator 80 fitting efficiently as above create a space in Y-direction for the terminal plates 110 and 120 extending parallel to the XZ plane. Thus, the blade open-close device 1 can have a smaller width in Y-direction.

Figure 7A:
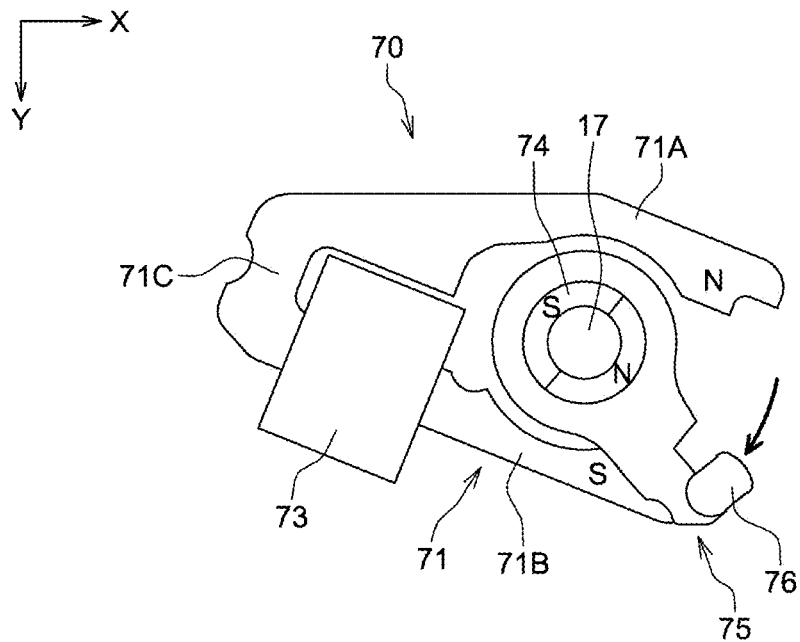
FIG. 7A is a schematic plan view of the drive actuator in the actuator unit shown in FIG. 5, showing its example operation.
Figure 7B:
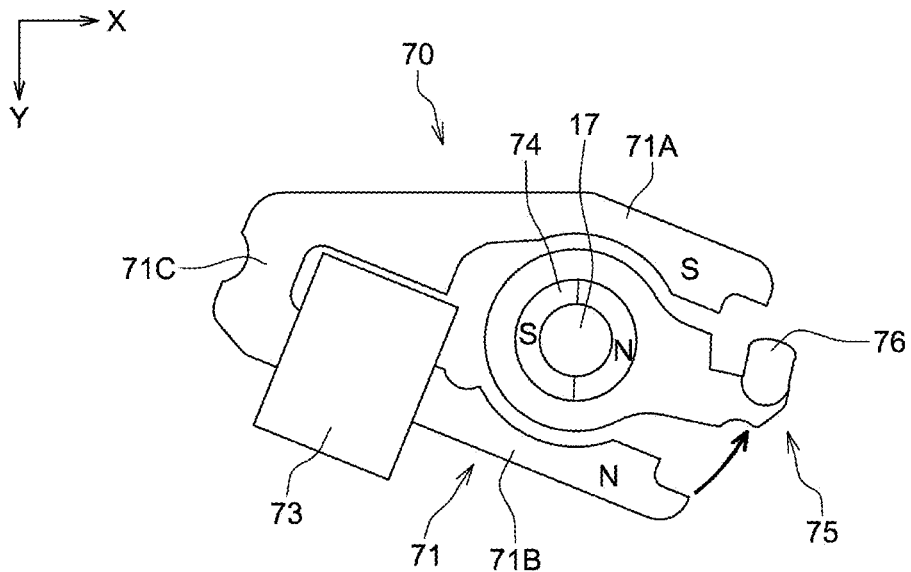
FIG. 7B is a schematic plan view of the drive actuator in the actuator unit shown in FIG. 5, showing its example operation.

FIGS. 7A and 7B are schematic plan views of the drive actuator 70, each showing its example operation. In the drive actuator 70 in the present embodiment, when the coil 73 is energized with a current through the wiring in the module board 2, the arms 71A and 71B of the yoke 71 are magnetically polarized (magnetized) oppositely to each other. The magnetic forces of the arms 71A and 71B then attract and rotate the rotor magnet 74.

For example, when the coil 73 in the drive actuator 70 is energized with a current flowing in one direction, the arms 71A and 71B of the yoke 71 are magnetically polarized or magnetized as shown in FIG. 7A. The magnetic poles of the arms 71A and 71B of the yoke 71 attract the respective opposite magnetic poles of the rotor magnet 74, thus causing the rotor magnet 74 to rotate clockwise. This causes the drive lever 75 to rotate clockwise about the shaft 17 on the base member 10.

When the coil 73 in the drive actuator 70 is energized with a current flowing in a direction opposite to the direction of the current in FIG. 7A, the arms 71A and 71B of the yoke 71 are magnetically polarized as shown in FIG. 7B. The magnetic poles of the arms 71A and 71B of the yoke 71 attract the respective opposite magnetic poles of the rotor magnet 74, thus causing the rotor magnet 74 to rotate counterclockwise. This causes the drive lever 75 to rotate counterclockwise about the shaft 17 on the base member 10.

Referring back to FIG. 3, the cam plate 60 has a lever engagement hole 63 engaged with the connecting part 76 of the drive lever 75 in the drive actuator 70. The lever engagement hole 63 has a minimum width slightly larger than the outer diameter of the connecting part 76 of the drive lever 75 in the drive actuator 70. The connecting part 76 of the drive lever 75 in the drive actuator 70 is received in the lever engagement hole 63 in the cam plate 60. The connecting part 76 of the drive lever 75 is thus engaged with the lever engagement hole 63 in the cam plate 60. As the drive lever 75 rotates about the shaft 17 on the base member 10 as described above, the cam plate 60 rotates about the support shaft 26 on the attachment base 22 in the actuator unit 20.

The blade member 50 includes an engagement pin 51 extending in the negative Z-direction. The engagement pin 51 is engaged with a pin engagement hole 62 in the cam plate 60. The pin engagement hole 62 has a minimum width slightly larger than the outer diameter of the engagement pin 51 on the blade member 50. The engagement pin 51 extending in the negative Z-direction from the blade member 50 is placed through an opening 34 in the partition and received in the pin engagement hole 62 in the cam plate 60. The engagement pin 51 on the blade member 50 is thus engaged with the pin engagement hole 62 in the cam plate 60. As the cam plate 60 rotates about the support shaft 26 on the attachment base 22 in the actuator unit 20, the engagement pin 51 on the blade member 50 moves while being engaged with the pin engagement hole 62 in the cam plate 60. The blade member 50 moves in X-direction as guided by the guides 15 and the guide posts 16 on the base member 10 described above.

FIG. 8A is a schematic plan view of the blade member 50 at the position shown in FIG. 2. In this state, the blade member 50 has the light entry opening 55 aligned with the opening 31 in the partition 30 in X-direction, and has the first light shield 53 located in the negative X-direction from the opening 31 in the partition 30. The opening 31 in the partition (and the opening 41 in the cover plate 40) is thus uncovered. The blade member 50 has the second light shield 54 located in the negative X-direction from the opening 32 in the partition 30. The opening 32 in the partition 30 (and the opening 42 in the cover plate 40) is thus uncovered. In this state, external light directly enters the lens in the lens unit in the space S1 through the opening 41 in the cover plate 40 and the opening 31 in the partition 30. External light also directly enters the lens in the lens unit in the space S2 through the opening 42 in the cover plate 40 and the opening 32 in the partition 30. This allows image capturing with the lens units. The state of the drive lever 75 in the drive actuator 70 and the state of the blade member 50 shown in FIG. 8A are each hereafter referred to as an open state.

When the coil 73 in the drive actuator 70 is energized in the state shown in FIG. 8A to rotate the rotor magnet 74 counterclockwise, the cam plate 60 with its lever engagement hole 63 engaged with the connecting part 76 of the drive lever 75 rotates clockwise about the support shaft 26 as shown in FIG. 8B. As the cam plate 60 rotates, the blade member 50 with its engagement pin 51 engaged with the pin engagement hole 62 in the cam plate 60 moves in the positive X-direction (closing direction) as shown in FIG. 8B. When the blade member 50 moves in the positive X-direction, the light entry opening 55 moves to a position in the positive X-direction from the opening 31 in the partition 30, the first light shield 53 covers the opening 31 in the partition 30, and the second light shield 54 covers the opening 32 in the partition 30. More specifically, the blade member 50 has the first light shield 53 and the second light shield 54 respectively aligned with the optical axes P1 and P2 of the lens units, blocking light passing through the openings 41 and 42 in the cover plate 40. The state of the drive lever 75 in the drive actuator 70 and the state of the blade member 50 shown in FIG. 8B are each hereafter referred to as a closed state.

For example, the blade member 50 may be formed from a material opaque to light to be captured by the lens units (e.g., visible light and infrared light). In this case, the blade member 50 in the closed state shown in FIG. 8B blocks light passing through the opening 41 in the cover plate 40, preventing the light from reaching the lens units. In this state, the lens units in operation are not allowed to capture images or videos. This prevents images or videos unintended by the user from being obtained.

When the coil 73 in the drive actuator 70 is energized in the state shown in FIG. 8B to rotate the rotor magnet 74 clockwise, the cam plate 60 with its lever engagement hole 63 engaged with the connecting part 76 of the drive lever 75 rotates counterclockwise about the support shaft 26. In this state, the blade member 50 with its engagement pin 51 engaged with the pin engagement hole 62 in the cam plate 60 moves in the negative X-direction (opening direction) to be in the open state shown in FIG. 8A.

In this manner, the drive actuator 70 in the actuator unit 20 causes the drive lever 75 to rotate with power from the module board 2 and allows the blade member 50 to move to change between the closed state and the open state with the connecting part 76 of the drive lever and the engagement pin 51 on the blade member 50.

The blade open-close device 1 in the present embodiment includes the blade member movable to cover or uncover the openings 41 and 42 (31 and 32) for the multiple lens units in a limited space in, for example, the display 910 of the laptop personal computer 900. The blade open-close device 1 can thus be smaller. The blade member 50 can cover or uncover the openings 41 and 42 (31 and 32) for the multiple lens units at the same time when moving in one direction (X-direction). The blade member 50 can thus operate in a unified manner and improve unity in design.

In the present embodiment, the yoke 71 is shaped to attract the rotor magnet 74 under the magnetic force from the rotor magnet 74 without any current supply to the coil 73 in the drive actuator 70. More specifically, when current supply to the coil 73 in the drive actuator 70 is stopped in the state shown in FIG. 7A, the rotor magnet 74 maintains its position and allows the drive lever 75 to remain in the open state under the magnetic force acting on the yoke 71. Similarly, when current supply to the coil 73 in the drive actuator 70 is stopped in the state shown in FIG. 7B, the rotor magnet 74 maintains its position and allows the drive lever 75 to remain in the closed state under the magnetic force acting on the yoke 71.

In this manner, the yoke 71 can be shaped to prevent the blade member 50 from unintentionally moving and changing from the open state or the closed state or from stopping between the open state and the closed state without any current supply to the coil 73 in the drive actuator 70. The yoke 71 may be shaped to retain the drive lever 75 in the open state alone or in the closed state alone. In particular, retaining the drive lever 75 in the closed state causes the blade member 50 to cover the openings 41 and 31 without any current supply to the coil 73 in the drive actuator 70. This can prevent images or videos unintended by the user from being obtained.

The blade open-close device 1 according to the present embodiment includes a locking assembly that can retain (lock) the blade member 50 in the open state or in the closed state. The blade member 50 locked in the open state or in the closed state by the locking assembly is immovable in X-direction as described above. The locking assembly is implemented by the stopper actuator 80 in the actuator unit 20.

In the stopper actuator 80 in the present embodiment, when the coil 83 is energized with a current through the wiring in the module board 2, the arms 81A and 81B of the yoke 81 are magnetically polarized (magnetized) oppositely to each other. The magnetic forces of the arms 81A and 81B then attract and rotate the rotor magnet 84.

Figure 9A:
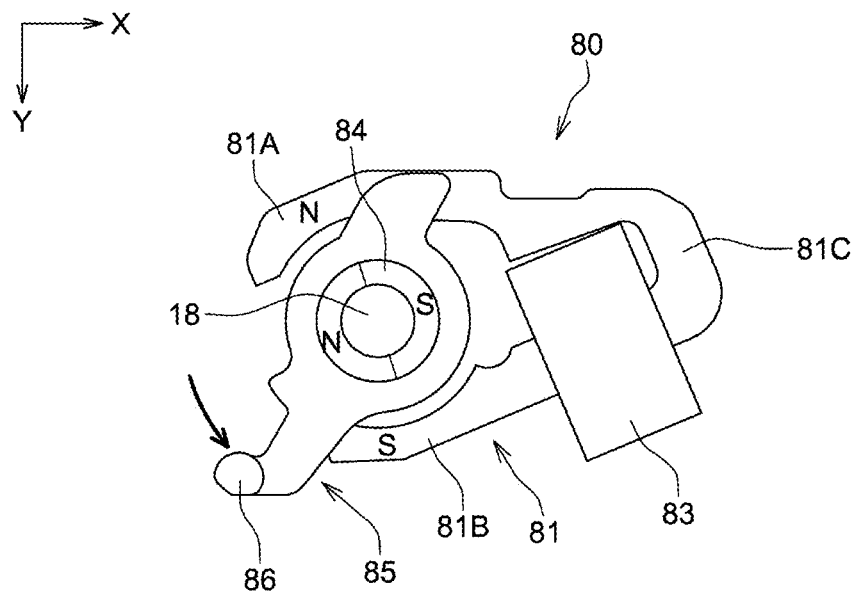
FIG. 9A is a schematic plan view of the stopper actuator in the actuator unit shown in FIG. showing its example operation.

For example, when the coil 83 in the stopper actuator 80 is energized with a current flowing in one direction, the arms 81A and 81B of the yoke 81 are magnetically polarized or magnetized as shown in FIG. 9A. The magnetic poles of the arms 81A and 81B of the yoke 81 attract the respective opposite magnetic poles of the rotor magnet 84, thus causing the rotor magnet 84 to rotate counterclockwise. This causes the stopper lever 85 to rotate counterclockwise about the shaft 18 on the base member 10. The movement restrictor 86 in the stopper lever 85 in this state is retracted from the path of the drive lever 75 in the drive actuator 70. The position of the stopper lever 85 in the stopper actuator 80 shown in FIG. 9A is hereafter referred to as an unlocking position.

When the stopper lever 85 is at the unlocking position, the movement restrictor 86 in the stopper lever 85 is not on the path of the drive lever 75 in the drive actuator 70 and allows the drive lever 75 in the drive actuator 70 to rotate without interference from the stopper lever 85. In this state, the blade member 50 connected to the connecting part 76 of the drive lever 75 is movable in X-direction. The stopper lever 85 at the unlocking position can thus cause the blade member 50 to move to change from the open state to the closed state or from the closed state to the open state with the drive actuator 70.

Figure 9B:
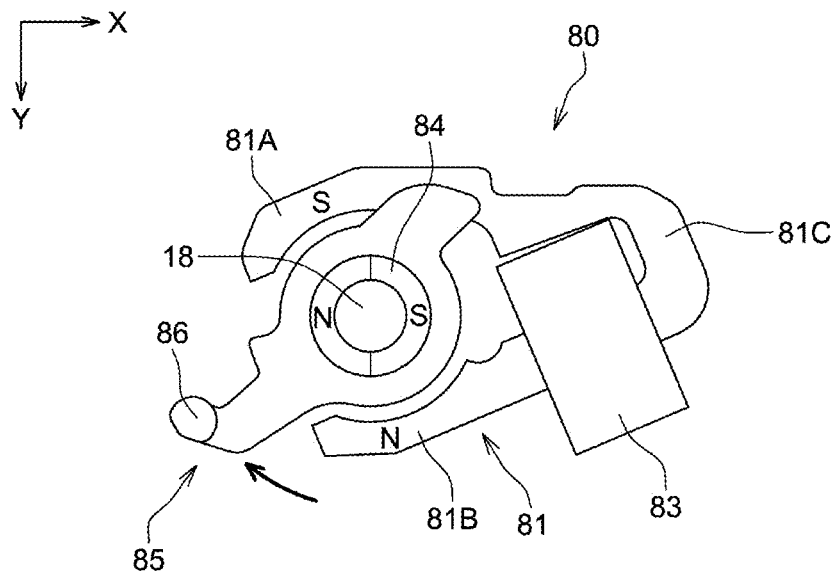
FIG. 9B is a schematic plan view of the stopper actuator in the actuator unit shown in FIG. 5, showing its example operation.

When the coil 83 in the stopper actuator 80 is energized with a current flowing in a direction opposite to the direction of the current in FIG. 9A, the arms 81A and 81B of the yoke 81 are magnetically polarized as shown in FIG. 9B. The magnetic poles of the arms 81A and 81B of the yoke 81 attract the respective opposite magnetic poles of the rotor magnet 84, thus causing the rotor magnet 84 to rotate clockwise. This causes the stopper lever 85 to rotate clockwise about the shaft 18 on the base member 10. The movement restrictor 86 in the stopper lever 85 in this state is located on the path of the drive lever 75 in the drive actuator 70. The position of the stopper lever 85 in the stopper actuator 80 shown in FIG. 9B is hereafter referred to as a locking position. When the stopper lever 85 is at the locking position, the movement restrictor 86 in the stopper lever 85 is on the path of the drive lever 75 in the drive actuator 70 and thus restricts movement of the drive lever 75 in the drive actuator 70.

In this manner, the stopper actuator 80 in the actuator unit 20 causes the stopper lever 85 to rotate with power from the module board 2, and allows the movement restrictor 86 in the stopper lever 85 to move between the position at which the movement restrictor 86 is retracted from the path of the drive lever 75 in the drive actuator 70 and the position at which the movement restrictor 86 is on the path.

In the present embodiment, the yoke 81 is shaped to attract the rotor magnet 84 under the magnetic force from the rotor magnet 84 without any current supply to the coil 83 in the stopper actuator 80. More specifically, when current supply to the coil 83 in the stopper actuator 80 is stopped in the state shown in FIG. 9A, the rotor magnet 84 maintains its position and allows the stopper lever 85 to remain at the unlocking position under the magnetic force acting on the yoke 81. Similarly, when current supply to the coil 83 in the stopper actuator 80 is stopped in the state shown in FIG. 9B, the rotor magnet 84 maintains its position and allows the stopper lever 85 to remain at the locking position under the magnetic force acting on the yoke 81.

In this manner, the yoke 81 can be shaped to prevent the stopper lever 85 from unintentionally moving from the unlocking position or the locking position or from stopping between the unlocking position and the locking position without any current supply to the coil 83 in the stopper actuator 80. The yoke 81 may be shaped to retain the stopper lever 85 at the unlocking position alone or at the locking position alone.

Figure 10A:
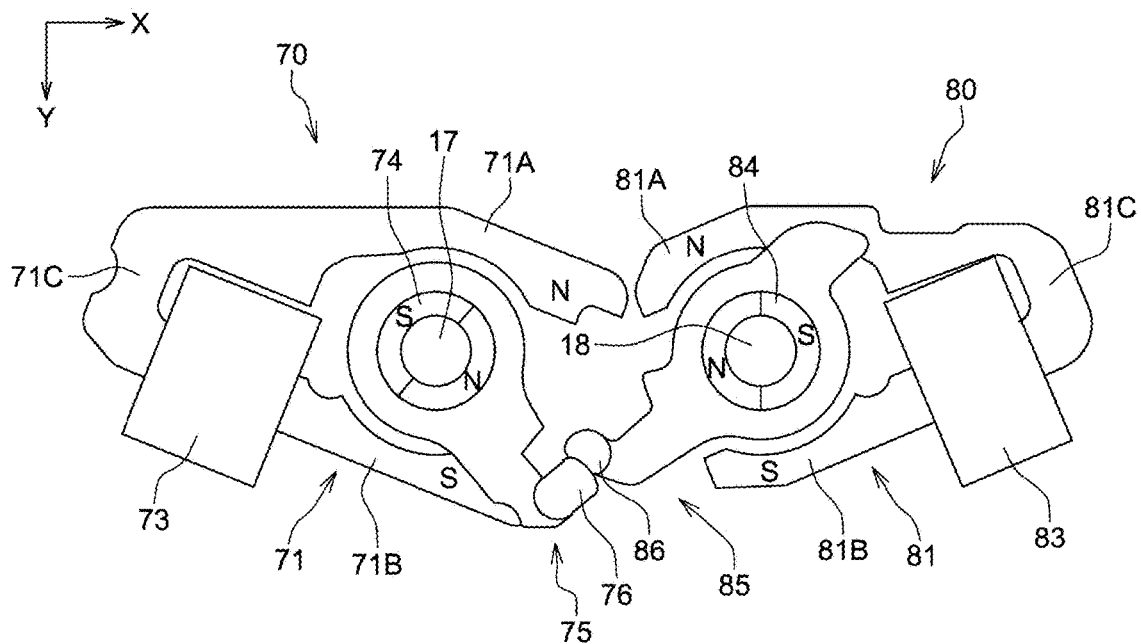
FIG. 10A is a schematic plan view of the actuator unit in FIG. 5 showing its example operation, with a drive lever in the drive actuator being in an open state and a stopper lever in the stopper actuator being at a locking position.

FIG. 10A describes the positional relationship between the drive actuator 70 and the stopper actuator 80 with the blade member 50 being in the open state. When the blade member is in the open state, the drive lever 75 in the drive actuator 70 is in the open state and the stopper lever 85 in the stopper actuator 80 is at the locking position. As described above, when the stopper lever 85 in the stopper actuator 80 is at the locking position, the movement restrictor 86 in the stopper lever 85 is on the path of the drive lever 75 in the drive actuator 70. In this state, the movement restrictor 86 in the stopper lever 85 in the stopper actuator 80 restricts the drive lever 75 in the drive actuator 70 from rotating (counterclockwise) to be in the closed state under any force applied to rotate the drive lever 75 in the drive actuator 70 to be in the closed state. This also retains (locks) the blade member 50 in the open state.

Figure 10B:
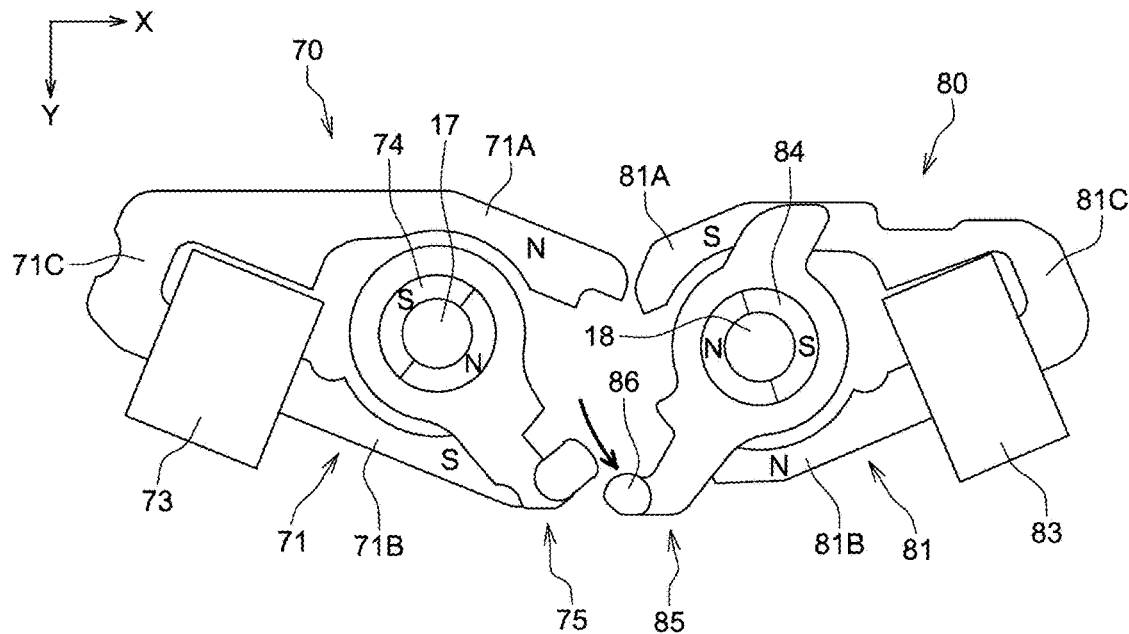
FIG. 10B is a schematic plan view of the actuator unit in FIG. 5 showing its example operation, with the drive lever in the drive actuator being in the open state and the stopper lever in the stopper actuator being at an unlocking position.

To move the blade member 50 to change from the state shown in FIG. 10A to the closed state, the coil 83 in the stopper actuator 80 is energized with a current to rotate the stopper lever 85 counterclockwise to the unlocking position as shown in FIG. 10B. This causes the movement restrictor 86 in the stopper lever 85 to move to a position retracted from the path of the drive lever 75 in the drive actuator 70 and allows the drive lever 75 in the drive actuator 70 to rotate without interference from the stopper lever 85.

Figure 10C:
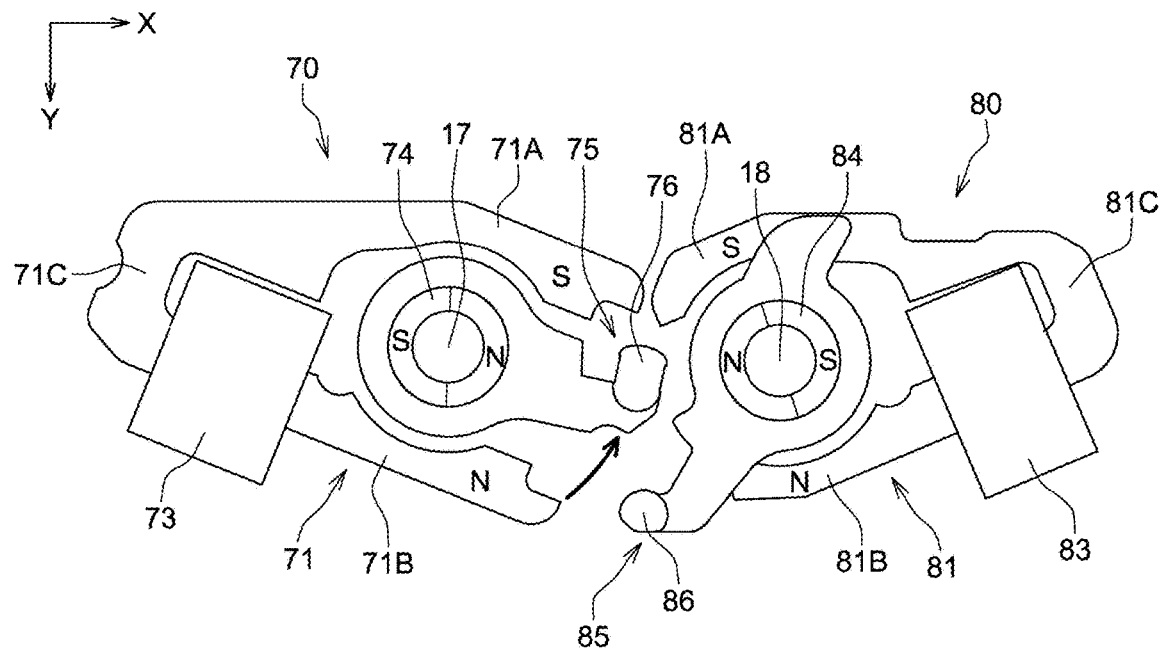
FIG. 10C is a schematic plan view of the actuator unit in FIG. 5 showing its example operation, with the drive lever in the drive actuator being in a closed state and the stopper lever in the stopper actuator being at the unlocking position.

The coil 73 in the drive actuator 70 is then energized with a current to rotate the drive lever 75 counterclockwise to be in the closed state as shown in FIG. 10C. The blade member moves to be in the closed state with the connecting part 76 of the drive lever 75 and the engagement pin 51 on the blade member 50 (the state shown in FIG. 8B).

Figure 10D:
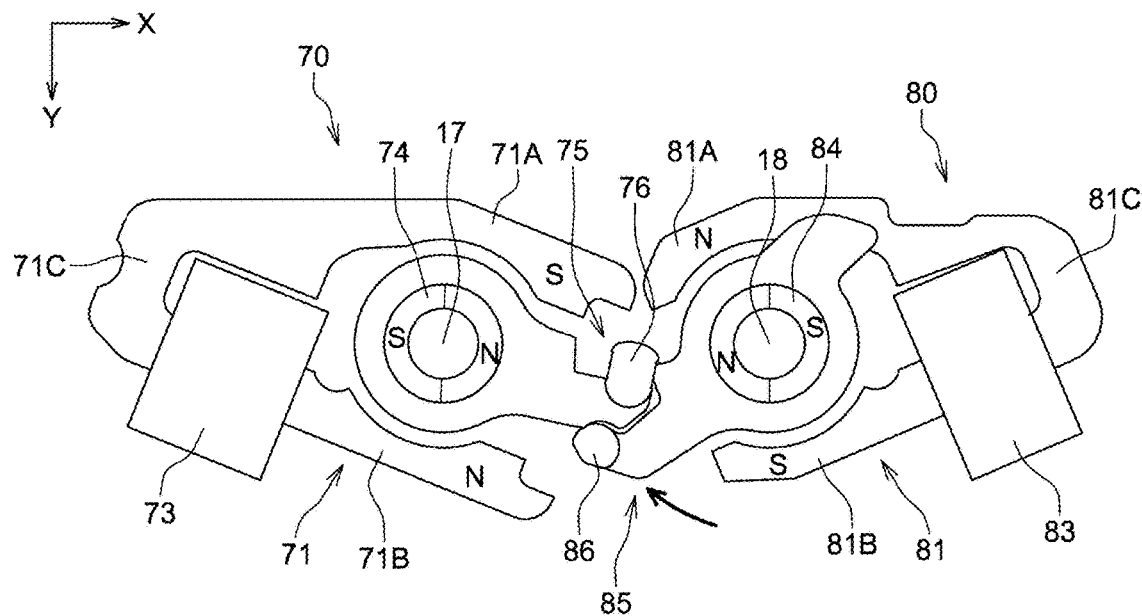
FIG. 10D is a schematic plan view of the actuator unit in FIG. 5 showing its example operation, with the drive lever in the drive actuator being in the closed state and the stopper lever in the stopper actuator being at the locking position.

After the blade member 50 moves to be in the closed state, the coil 83 in the stopper actuator 80 is energized with a current again to rotate the stopper lever 85 clockwise to the locking position as shown in FIG. 10D. This causes the movement restrictor 86 in the stopper lever 85 in the stopper actuator 80 to move to a position on the path of the drive lever 75 in the drive actuator 70 and restricts movement of the drive lever 75 in the drive actuator 70. In this state, the movement restrictor 86 in the stopper lever 85 in the stopper actuator 80 restricts the drive lever 75 in the drive actuator 70 from rotating (clockwise) to be in the open state under any force applied to rotate the drive lever 75 in the drive actuator 70 to be in the open state. This retains (locks) the blade member 50 connected to the connecting part 76 of the drive lever in the drive actuator 70 in the closed state.

To change the blade member 50 from the state shown in FIG. 10D to the open state, the coil 83 in the stopper actuator 80 is energized with a current to rotate the stopper lever 85 counterclockwise to the unlocking position (the state shown in FIG. 10C). This causes the movement restrictor 86 in the stopper lever 85 to move to a position retracted from the path of the drive lever 75 in the drive actuator 70 and allows the drive lever 75 in the drive actuator 70 to rotate without interference from the stopper lever 85.

The coil 73 in the drive actuator 70 is then energized with a current to rotate the drive lever 75 in the drive actuator 70 clockwise to be in the open state (the state shown in FIG. 10B). The blade member 50 moves to be in the open state (the state shown in FIG. 8A) with the connecting part 76 of the drive lever 75 and the engagement pin 51 on the blade member 50.

After the blade member 50 moves to be in the open state, the coil 83 in the stopper actuator 80 is energized with a current again to rotate the stopper lever 85 clockwise to the locking position (the state shown in FIG. 10A). This causes the movement restrictor 86 in the stopper lever 85 in the stopper actuator 80 to move to a position on the path of the drive lever in the drive actuator 70 and restricts movement of the drive lever 75 in the drive actuator 70. In this state, the movement restrictor 86 in the stopper lever 85 in the stopper actuator 80 restricts the drive lever 75 in the drive actuator 70 from rotating (counterclockwise) to be in the closed state under any force applied to rotate the drive lever 75 in the drive actuator 70 to be in the closed state. This retains (locks) the blade member 50 connected to the connecting part 76 of the drive lever 75 in the drive actuator 70 in the open state.

In the present embodiment, when the blade member 50 is in the open state or in the closed state, the stopper lever 85 in the stopper actuator 80 is moved to the locking position. This retains the drive lever 75 in the drive actuator 70 in the open state or in the closed state with its connecting part 76 being restricted from moving by the movement restrictor 86 in the stopper lever 85 in the stopper actuator 80. This can retain (lock) the blade member 50 in the open state or in the closed state. This prevents the blade member 50 in the open state or in the closed state from unintentionally changing from the open state or the closed state under external vibration or impact, thus reducing malfunctions of the blade open-close device 1. To move the blade member 50 intentionally, the stopper lever 85 in the stopper actuator 80 is moved from the locking position to the unlocking position to unlock the drive lever 75 in the drive actuator This allows the drive actuator 70 to move the blade member 50 to change between the open state and the closed state.

The first light shield 53 and the second light shield 54 in the blade member 50 may partially block light entering the lens units through the openings 41, 42, 31, and 32 rather than fully blocking light entering the lens units. To partially block light entering the lens units, for example, the blade member 50 may be formed from a material having a low transmittance to light to be captured by the lens units (e.g., visible light and infrared light), may be colored, or may be patterned with irregularities or holes (e.g., a reticulated or grid pattern and a concentric circle pattern). This causes images or videos captured by the lens units to be partly unclear or invisible, thus preventing images or videos unintended by the user from being obtained.

In the present embodiment, the yoke 71 in the drive actuator 70 is shaped as described above, allowing the drive actuator 70 to retain the blade member 50 in position. The blade open-close device 1 further including the above locking assembly more reliably reduces unintentional movement of the blade member 50.

The blade member 50 may have a predetermined optical effect (e.g., a mosaic filter, scattering, and diffuse reflection) for light entering the lens units through the openings 41, 42, 31, and 32. The blade member 50 also causes images or videos captured by the lens units to be partly unclear or invisible, thus preventing images or videos unintended by the user from being obtained.

The blade member 50 in the closed state has the outer surface exposed outside through the opening 41 in the cover plate 40. The blade member 50 may have the outer surface colored with a highly visible color (e.g., red) or designed with, for example, a highly visible geometrical pattern (e.g., a star, a square, a polygon, or stripes), a logo, or an illustration. The blade member 50 having the outer surface with a highly visible color or design is easily viewable by the user when the blade member 50 is in the closed state to allow the user to readily learn about the protection from unintended image or video capturing.

Although the opening 41 in the cover plate 40 and the opening 31 in the partition 30 are circular in the illustrated embodiment, the openings 41 and 31 may be of any shape such as rectangular and elliptical, rather than being circular.

Although the drive actuator 70 includes the flat U-shaped yoke 71 and the rotor magnet 74 in combination in the above embodiment, the drive actuator herein is not limited to this structure, and may have any structure that can move the blade member 50 to change between the closed state and the open state. Similarly, although the stopper actuator 80 includes the flat U-shaped yoke 81 and the rotor magnet 84 in combination in the above embodiment, the stopper actuator herein is not limited to this structure, and may have any structure that can restrict the operation of the drive actuator 70.

In the above embodiment, the stopper actuator 80 is activated to move the stopper lever 85 to the locking position both when the blade member 50 is in the open state and when the blade member 50 is in the closed state. In some embodiments, the stopper lever 85 may be moved to the locking position either when the blade member 50 is in the open state or when the blade member 50 is in the closed state. In this case, the stopper lever 85 may move to the locking position when the blade member 50 is in the closed state to prevent images or videos unintended by the user from being captured with the lens units.

For example, when an electronic device such as the laptop personal computer 900 is powered off or the display 910 of the laptop personal computer 900 is closed, the drive actuator alone may retain the blade member 50 in position. When the electronic device is powered on or the display 910 of the laptop personal computer 900 is open, the locking assembly described above may be used to lock the blade member 50 in position to avoid unintentional movement of the blade member 50. In this manner, the locking assembly in one or more embodiments of the present invention may be activated or may not be activated depending on the state of the electronic device incorporating the blade open-close device 1 or use of the device.

The blade open-close device 1 according to the above embodiment includes one base member 10, one actuator unit 20, one partition 30, one cover plate 40, one blade member 50, one cam plate 60, and one drive actuator 70. However, the blade open-close device 1 may include multiple base members 10, multiple actuator units 20, multiple partitions 30, multiple cover plates 40, multiple blade members 50, multiple cam plates 60, and multiple drive actuators 70. For example, a blade open-close device 201 according to an embodiment shown in FIG. 11 includes a base including two base members 210A and 210B each having substantially the same structure as the above base member 10. The base member 210A has an upper portion covered with a cover plate 240A as a cover. The base member 210B has an upper portion covered with a cover plate 240B as a cover. Although not described in detail, the blade open-close device 201 includes the actuator unit 20, the partition 30, the cam plate 60, and the drive actuator 70 described above between the base member 210A and the cover plate 240A and between the base member 210B and the cover plate 240B.

As shown in FIG. 12A, the blade open-close device 201 includes a blade including a blade member 250A movable in X-direction inside the base member 210A and a blade member 250B movable in X-direction inside the base member 210B. The base members 210A and 210B each accommodate the above drive actuator 70 as a drive.

The blade member 250B includes a first light shield 254 that can cover the opening 42 (first opening) in the cover plate 240B and a light entry opening 255 that can connect with the opening 42 in the cover plate 240B. The blade member 250A includes a second light shield 253 that can cover the opening 41 (second opening) in the cover plate 240A. In the state shown in FIG. 12A, the blade member 250B has the light entry opening 255 aligned with the opening 42 in the cover plate 240B in X-direction, and has the first light shield 254 located in the negative X-direction from the opening 42 in the cover plate 240B. The opening 42 in the cover plate 240B is thus uncovered. The blade member 250A has the second light shield 253 located in the negative X-direction from the opening 41 in the cover plate 240A. The opening 41 in the cover plate 240A is thus uncovered. In this state, external light directly enters the lens in the lens unit in the space S1 through the opening 41 in the cover plate 240A. External light also directly enters the lens in the lens unit in the space S2 through the opening 42 in the cover plate 240B. This allows image capturing with the lens units.

When the coils in the drive actuators 70 for the base members 210A and 210B are energized in the state shown in FIG. 12A to rotate the rotor magnets 74, the cam plates 60 with their lever engagement holes 63 engaged with the connecting parts 76 of the drive levers 75 rotate about the support shafts 26 as shown in FIG. 12B. As the cam plates 60 rotate, blade members 250A and 250B with their engagement pins 51 engaged with the pin engagement holes 62 in the cam plates 60 move in the positive X-direction (closing direction) as shown in FIG. 12B. When the blade member 250B moves in the positive X-direction, the light entry opening 255 moves to a position in the positive X-direction from the opening 42 in the cover plate 240B, and the first light shield 254 covers the opening 42 in the cover plate 240B. When the blade member 250A moves in the positive X-direction, the second light shield 253 covers the opening 41 in the cover plate 240A. More specifically, the blade member 250B has the first light shield 254 aligned with the optical axis P1 of one of the lens units, and the blade member 250A has the second light shield 253 aligned with the optical axis P2 of the other lens unit. The blade members 250A and 250B block light passing through the openings 41 and 42 in the cover plates 240A and 240B.

The blade members 250A and 250B can cover or uncover the openings 41 and 42 for the multiple lens units at the same time when moving in the same direction (X-direction). The blade members 250A and 250B can thus operate in a unified manner and improve unity in design.

Figure 11:
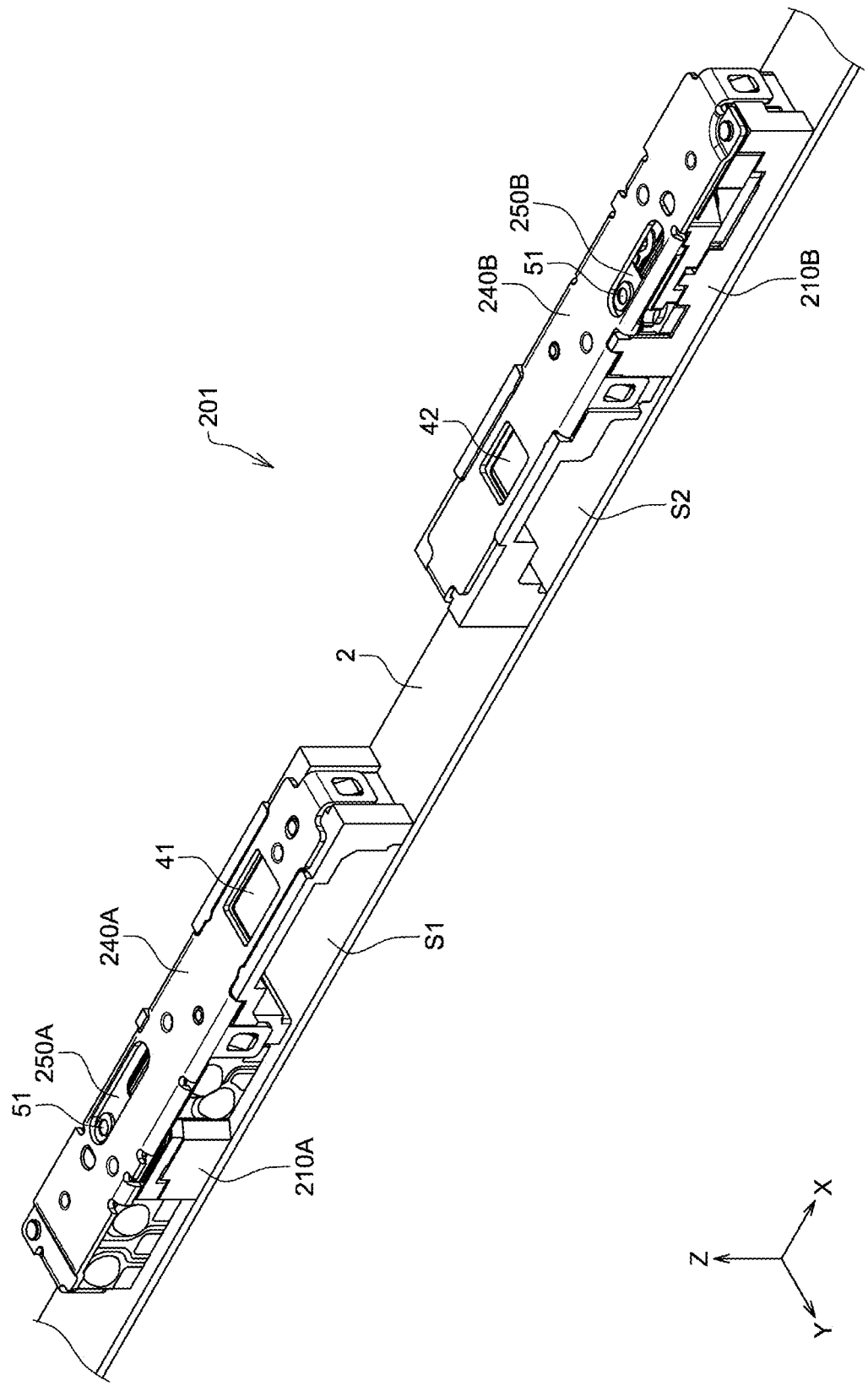
FIG. 11 is a perspective view of a blade open-close device according to another embodiment of the present invention, together with a module board.
Figure 13:
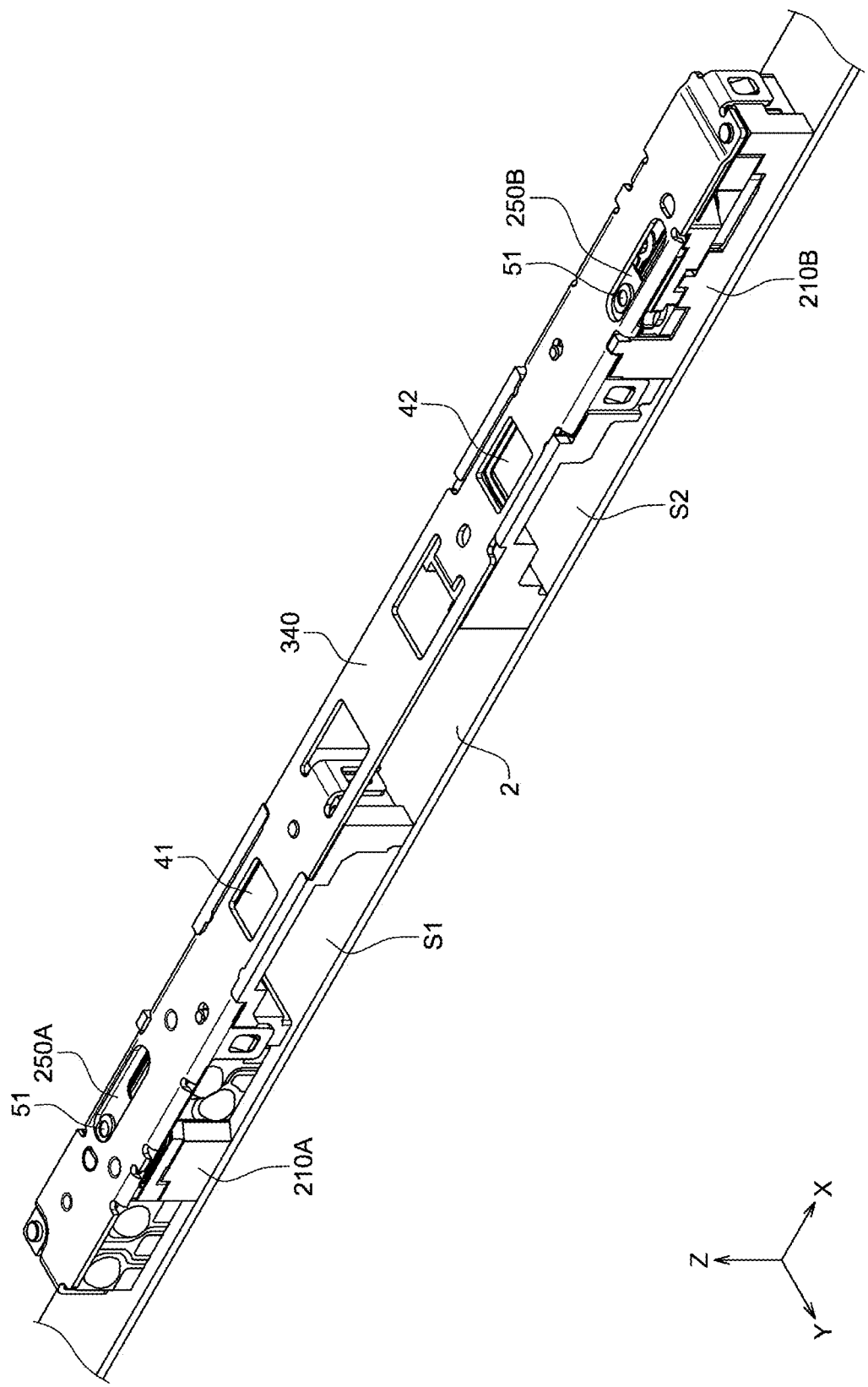
FIG. 13 is a perspective view of a blade open-close device according to still another embodiment of the present invention, together with a module board.

The cover plates 240A and 240B shown in FIG. 11 may be integral with each other to form a single cover plate 340 shown in FIG. 13. This structure uses fewer components.

As described above, a thin blade open-close device according to a first aspect of the present invention can be incorporated in a limited space. The blade open-close device includes a base including a first space accommodating a first lens unit and a second space accommodating a second lens unit, a cover covering the base at least partially, and a blade between the base and the cover. The cover has a first opening aligned with an optical axis of the first lens unit and a second opening aligned with an optical axis of the second lens unit. The blade includes a first light shield that covers the first opening in the cover, a light entry opening that connects with the first opening in the cover, and a second light shield that covers the second opening in the cover. The blade open-close device includes a drive that moves the blade in a closing direction to change from an open state in which the light entry opening in the blade connects with the first opening in the cover to a closed state in which the first light shield in the blade covers the first opening in the cover and the second light shield in the blade covers the second opening in the cover. The second opening in the cover may be uncovered with the blade in the open state.

The blade open-close device with this structure includes the blade movable to cover or uncover the openings for the multiple lens units in a limited space. The blade open-close device can thus be smaller. The blade can cover or uncover the openings for the multiple lens units at the same time when moving in one direction (X-direction). The blade can thus operate in a unified manner and improve unity in design.

The blade may be a single blade member. In this case, the drive may be a single drive actuator that moves the single blade member in the closing direction.

The blade may include a first blade member including the first light shield and the light entry opening, and a second blade member including the second light shield. In this case, the drive may include a first drive actuator that moves the first blade member in the closing direction, and a second drive actuator that moves the second blade member in the closing direction.

The cover may be a single cover plate covering the first blade member and the second blade member.

An electronic device according to a second aspect of the present invention includes the blade open-close device described above.

Although the embodiments of the present invention have been described above, the present invention is not limited to the above embodiments and may be modified variously within the scope of its technical idea.

What is claimed is:

1. A blade open-close device, comprising:
   a base including a first space accommodating a first lens unit and a second space accommodating a second lens unit, wherein the base further includes:
      a guide portion including a plurality of guides extending in a first direction perpendicular to a top surface of the base, wherein a first guide of the plurality of guides is on an opposite side of the base from a second guide of the plurality of guides, and
      a plurality of guide posts extending in the first direction;
   a cover covering the base at least partially, the cover having a first opening aligned with an optical axis of the first lens unit and a second opening aligned with an optical axis of the second lens unit;
   a blade between the base and the cover, wherein the blade is between the first guide and the second guide, and the blade includes:
      a first light shield configured to cover the first opening in the cover,
      a light entry opening configured to connect with the first opening in the cover,
      a second light shield configured to cover the second opening in the cover, and
      a plurality of guide holes, wherein each of the plurality of guide holes receives a corresponding guide post of the plurality of guide posts; and
   a drive configured to move the blade in a closing direction to change from an open state in which the light entry opening in the blade connects with the first opening in the cover to a closed state in which the first light shield in the blade covers the first opening in the cover and the second light shield in the blade covers the second opening in the cover.

2. The blade open-close device according to claim 1, wherein the second opening in the cover is uncovered with the blade in the open state.

3. The blade open-close device according to claim 1, wherein
the blade is a single blade member, and
the drive is a single drive actuator configured to move the single blade member in the closing direction.

4. The blade open-close device according to claim 3, wherein
the blade includes
a first blade member including the first light shield and the light entry opening, and
a second blade member including the second light shield, and
the drive includes
a first drive actuator configured to move the first blade member in the closing direction, and
a second drive actuator configured to move the second blade member in the closing direction.

5. The blade open-close device according to claim 4, wherein
the cover is a single cover plate covering the first blade member and the second blade member.

6. An electronic device, comprising:
the blade open-close device according to claim 1.

7. A blade open-close device, comprising:
a base including a first space accommodating a first lens unit and a second space accommodating a second lens unit;
a cover covering the base at least partially, the cover having a first opening aligned with an optical axis of the first lens unit and a second opening aligned with an optical axis of the second lens unit;
a blade between the base and the cover, the blade including
a first light shield configured to cover the first opening in the cover,
a light entry opening configured to connect with the first opening in the cover, and
a second light shield configured to cover the second opening in the cover; and
a drive configured to move the blade in a closing direction to change from an open state in which the light entry opening in the blade connects with the first opening in the cover to a closed state in which the first light shield in the blade covers the first opening in the cover and the second light shield in the blade covers the second opening in the cover, wherein
the blade is a single blade member, and
the drive is a single drive actuator configured to move the single blade member in the closing direction, wherein
the blade includes
a first blade member including the first light shield and the light entry opening, and
a second blade member including the second light shield, and
the drive includes
a first drive actuator configured to move the first blade member in the closing direction, and
a second drive actuator configured to move the second blade member in the closing direction.

8. The blade open-close device according to claim 7, wherein
the cover is a single cover plate covering the first blade member and the second blade member.

* * * * *